United States Patent
Tully et al.

(10) Patent No.: US 11,555,135 B2
(45) Date of Patent: Jan. 17, 2023

(54) CYANOACRYLATE COMPOSITIONS

(71) Applicant: Henkel AG & Co. KGaA, Duesseldorf (DE)

(72) Inventors: Raymond P. Tully, Slane County (IE); Rory Barnes, Lucan County (IE); Mark Loane, Naas County (IE); Deborah Coleman, Drogheda County (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 503 days.

(21) Appl. No.: 16/670,074

(22) Filed: Oct. 31, 2019

(65) Prior Publication Data
US 2020/0102480 A1 Apr. 2, 2020

Related U.S. Application Data

(63) Continuation of application No. PCT/EP2018/059050, filed on Apr. 9, 2018.

(30) Foreign Application Priority Data

May 5, 2017 (GB) .................................. 1707222

(51) Int. Cl.
| | | |
|---|---|---|
| C09D 4/06 | (2006.01) | |
| C09D 11/08 | (2006.01) | |
| C09D 11/00 | (2014.01) | |
| C09D 133/14 | (2006.01) | |
| C09D 133/04 | (2006.01) | |
| C08L 33/04 | (2006.01) | |
| C08F 263/04 | (2006.01) | |
| C08F 265/06 | (2006.01) | |
| C09J 4/06 | (2006.01) | |
| C09J 5/00 | (2006.01) | |
| C09J 11/08 | (2006.01) | |
| C09J 133/14 | (2006.01) | |

(52) U.S. Cl.
CPC . C09J 4/06 (2013.01); C09J 5/00 (2013.01); C09J 11/08 (2013.01); C09J 133/14 (2013.01); *C09J 2423/04* (2013.01); *C09J 2431/00* (2013.01); *C09J 2433/00* (2013.01)

(58) Field of Classification Search
None
See application file for complete search history.

(56) References Cited

U.S. PATENT DOCUMENTS

| | | |
|---|---|---|
| 3,832,334 A | 8/1974 | O'Sullivan et al. |
| 3,975,422 A | 8/1976 | Buck |
| 4,012,402 A | 3/1977 | Buck |
| 4,196,271 A | 4/1980 | Kimura et al. |
| 4,440,910 A | 4/1984 | O'Connor |
| 4,450,265 A | 5/1984 | Harris |
| 4,490,515 A | 12/1984 | Mariotti et al. |
| 4,532,293 A | 7/1985 | Ikeda et al. |
| 4,556,700 A | 12/1985 | Harris et al. |
| 4,560,723 A | 12/1985 | Millet et al. |
| 4,622,414 A | 11/1986 | Mckervey |
| 4,636,539 A | 1/1987 | Harris et al. |
| 4,695,615 A | 9/1987 | Leonard et al. |
| 4,718,966 A | 1/1988 | Harris et al. |
| 4,837,260 A | 6/1989 | Sato et al. |
| 4,855,461 A | 8/1989 | Harris |
| 4,906,317 A | 3/1990 | Liu |
| 5,288,794 A | 2/1994 | Attarwala |
| 5,312,864 A | 5/1994 | Wenz et al. |
| 5,328,944 A | 7/1994 | Attarwala et al. |
| 5,530,037 A | 6/1996 | McDonnell et al. |
| 5,536,799 A | 7/1996 | Takahashi et al. |
| 6,096,848 A | 8/2000 | Gololobov et al. |
| 6,607,632 B1 | 8/2003 | McDonnell et al. |
| 8,981,027 B2 | 3/2015 | Ward et al. |
| 9,458,361 B2 | 10/2016 | Ishizaki et al. |
| 2008/0085285 A1 | 7/2008 | Attarwala et al. |
| 2014/0124137 A1 | 5/2014 | Hedderman et al. |
| 2014/0329959 A1* | 11/2014 | Barnes ............... C09J 4/06 525/289 |
| 2017/0335151 A1* | 11/2017 | Ward ............... C08F 222/322 |

FOREIGN PATENT DOCUMENTS

| | | |
|---|---|---|
| CN | 104284955 | 1/2015 |
| CN | 105143375 | 12/2015 |
| CN | 104937056 | 3/2018 |
| CN | 101679709 | 3/2020 |
| EP | 0058187 | 8/1982 |
| EP | 0690112 | 1/1996 |
| WO | 2010029134 | 3/2010 |

(Continued)

OTHER PUBLICATIONS

International Search Report issued in connection with International Patent Application No. PCT/EP2018/059050 dated Jul. 17, 2018.

H.V. Coover, D.W. Dreifus and J.T. O'Connor, "Cyanoacrylate Adhesives" in Handbook of Adhesives, 27, 463-77, I. Skeist, ed., Van Nostrand Reinhold, New York, 3rd ed. (1990).

G.H. Millet, "Cyanoacrylate Adhesives" in Structural Adhesives: Chemistry and Technology, S.R. Hartshorn, ed., Plenum Press, New York, p. 249-307 (1986).

Zhang Zaixin, The progress of the engineering adhesive instant cyanoacrylate adhesives, Materials for Mechanical Engineering, No. 5, pp. 1-3, (1986)—English translation Abstract.

(Continued)

*Primary Examiner* — Sheeba Ahmed

(74) *Attorney, Agent, or Firm* — Steven C. Bauman

(57) ABSTRACT

Cyanoacrylate compositions, methods for forming same, and applications thereof are disclosed. The compositions demonstrate improved thermal ageing performance, including improved tensile strength performance after heat ageing in high humidity.

16 Claims, 1 Drawing Sheet

(56) References Cited

FOREIGN PATENT DOCUMENTS

WO      2010091975      8/2010

OTHER PUBLICATIONS

P. Samatha et al., Effect of Addition of Various Acrylates on the Performance of Ethyl Cyanoacrylate Adhesive, Polymer-plastics Technology and Engineering, vol. 39, No. 2, pp. 381-392, (2000)—English translation Abstract.

Cai Boru et al., Flexible copolymer modified ethyl cyanoacrylate adhesive, Bonding, No. 1, pp. 18-20, (1982)—English translation Abstract.

Nie Cong et al., Study on humidity-heat aging resistance of α-cyanoacrylate adhesive, China Adhesives, No. 1, pp. 15-17, (2013)—English translation Abstract.

\* cited by examiner

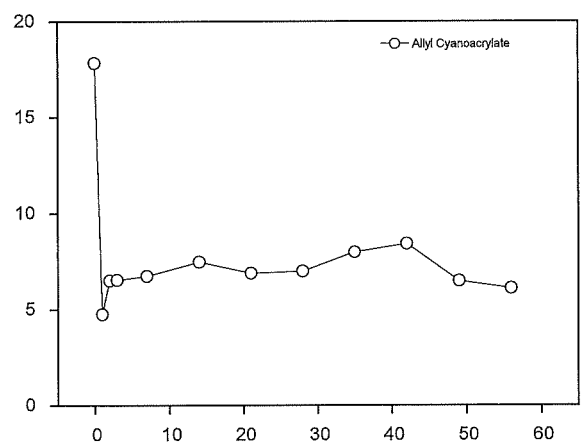

CYANOACRYLATE COMPOSITIONS

BACKGROUND

Field

The present invention relates to cyanoacrylate-containing compositions, which when cured provide improved heat resistance.

Brief Description of Related Technology

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives*, 27, 463-77, I. Skeist, ed., Van Nostrand Reinhold, New York, 3rd ed. (1990). See also G. H. Millet, "Cyanoacrylate Adhesives" in *Structural Adhesives: Chemistry and Technology*, S. R. Hartshorn, ed., Plenum Press, New York, p. 249-307 (1986).

In the past, efforts have been made to improve the heat resistance of cured products of cyanoacrylate composition, particularly upon exposure to temperatures of 80° C. and greater. As the cured products are thermoplastic in nature they tend to soften as the temperature increases, and when the Tg of the material is surpassed the cured product begins to flow. As the temperature increase progresses, a degradation begins and the physical properties deteriorate. As a result, commercial applications for cyanoacrylates where exposure to elevated temperature conditions is likely have proven tricky and consequently have been limited.

Numerous attempts to remedy this situation have been undertaken in the past.

U.S. Pat. No. 4,440,910 (O'Connor) pioneered rubber toughened cyanoacrylate compositions through the use of certain organic polymers as toughening additives that are elastomeric, i.e., rubbery, in nature. The '910 patent is thus directed to and claims a curable adhesive comprising a substantially solvent-free mixture of: (a) a cyanoacrylate ester, and (b) about 0.5% to about 20% by weight of an elastomeric polymer. The elastomeric polymer is selected from elastomeric copolymers of a lower alkene monomer and (i) acrylic acid esters, (ii) methacrylic acid esters or (iii) vinyl acetate. More specifically, the '910 patent notes that as toughening additives for cyanoacrylates, acrylic rubbers; polyester urethanes; ethylene-vinyl acetates; fluorinated rubbers; isoprene-acrylonitrile polymers; chlorosulfinated polyethylenes; and homopolymers of polyvinyl acetate were found to be particularly useful.

The elastomeric polymers are described in the '910 patent as either homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic include dienes, reactive halogen-containing unsaturated compounds and other acrylic monomers such as acrylamides.

One group of elastomeric polymers are copolymers of methyl acrylate and ethylene, manufactured by DuPont, under the name of VAMAC, such as VAMAC N123 and VAMAC B-124. VAMAC N123 and VAMAC B-124 are reported by DuPont to be a master batch of ethylene/acrylic elastomer.

For a number of years since the filing of the '910 patent, Henkel Corporation (as the successor to Loctite Corporation) has sold rubber toughened cyanoacrylate adhesive products under the tradename BLACK MAX, which employ as the rubber toughening component the DuPont materials called VAMAC B-124 and N123. In addition, Henkel has sold in the past clear and substantially colourless rubber toughened cyanoacrylate adhesive products, namely, LOCTITE 4203, 4204 and 4205, which employ as the rubber toughening component the DuPont material, VAMAC G. While VAMAC G contains neither stabilizers nor fillers, it does contain processing aids.

In an effort to improve moisture and thermal resistance of cyanoacrylates applied to substrates constructed with nitrogen- or sulfur-containing compounds, such as synthetic rubbers like chloroprene rubber and EPDM, and Bakelite, U.S. Pat. No. 5,536,799 discloses a cyanoacrylate adhesive composition which comprises (a) a cyanoacrylate and (b) at least one di- or higher functional ester, such as tri- or higher acrylates or methacrylates, having an alcohol residue and having an acid residue, where the alcohol residue is a residue of dipentaerythritol and the acid residue is a residue of an acrylic or methacrylic acid. More specifically, the di- or higher functional ester is reported as (i) an ester of a dipentaerythritol with an acrylic acid or a methacrylic acid, (ii) an ester of a modified alcohol with an acrylic acid or a methacrylic acid, where the modified alcohol is a dipentaerythritol modified by addition of a lactone, and (iii) a combination of an ester of a dipentaerythritol with an acrylic acid or a methacrylic acid and an ester of the modified alcohol with an acrylic acid or a methacrylic acid.

U.S. Pat. No. 5,288,794 (Attarwala) is directed to an improved cyanoacrylate monomer adhesive formulation, where an effective amount, for enhancing the thermal resistance of the polymerized adhesive, of a mono-, poly- or hetero-aromatic compound characterized by at least three substitutions on an aromatic ring thereof, two or more of the substitutions being electron withdrawing groups, is provided. Examples of the aromatic compound are given as 2,4-dinitrofluorobenzene; 2,4-dinitrochlorobenzene; 2,4-difluoronitrobenzene; 3,5-dinitrobenzonitrile; 2-chloro-3,5-dinitrobenzonitrile; 4,4'-difluoro-3,3'-dinitrophenyl sulfone; pentafluoronitrobenzene; pentafluorobenzonitrile; α,α,α-2-tetrafluoro-p-tolunitrile and tetrachloroterphthalonitrile.

U.S. Pat. No. 3,832,334 described cyanoacrylate compositions comprising maleic anhydride, which is reported to produce cyanoacrylate adhesives having increased thermal resistance (when cured) while preserving fast cure speed.

U.S. Pat. No. 4,196,271 is directed to tri-, tetra- and higher carboxylic acids or their anhydrides, which are reported to be useful for improving heat resistance of cured cyanoacrylate adhesives.

U.S. Pat. No. 4,450,265 is directed to the use of phthalic anhydride to improve heat resistance of cyanoacrylate adhesives. More specifically, the '265 patent is directed to and claims an adhesive composition comprising a polymerizable constituent the major part of which comprises at least one ester of 2-cyanoacrylic acid, characterized in that the composition additionally comprises a proportion of phthalic anhydride effective for favorably influencing the strength and/or durability of adhesive bonds formed from the composition, under exposure to moisture or elevated temperature. The effective amount is reported as 0.1% to 5.0%, such as 0.3% to 0.7%, by weight of the composition. The '265 patent reports the superiority of phthalic anhydride over compositions where no additive was used, and where maleic anhydride was used (though less pronounced in the case of stainless steel lap shears than in those of aluminium).

U.S. Pat. No. 4,532,293 is directed to the use of benzophenonetetracarboxylic acid or its anhydride to provide a superior heat resistance for cyanoacrylate adhesives.

U.S. Pat. No. 4,490,515 is directed to cyanoacrylate compositions containing certain maleimide or nadimide compounds to improve hot strength properties.

U.S. Pat. No. 4,560,723 describes certain cyanoacrylate adhesives containing a certain treated copolymer toughener, and a "sustainer" compound having certain compatibility properties said to provide improved retention of toughness on heat aging of the cured adhesive. Various substituted aryl compounds are identified as suitable "sustainers," including nitrobenzene, 1,2-dichlorobenzene, 1,2,4-trichlorobenzene and bromochlorobenzene.

One way to improve thermal stability without resorting to additive chemistry involves the use of an allyl-2-cyanoacrylate, in whole or in part, as the cyanoacrylate component. It is believed that allyl-2-cyanoacrylate will undergo a cross-linking reaction through the allyl functional groups, once given a post-bake (either as an additional process step or as a result of the environment in which they are used) after the initial cure occurs.

While the application of a post-bake certainly provides an allyl-2-cyanoacrylate-containing adhesive with significant improvements in thermal durability (see FIG. 1), post-bake processing is not devoid of its own issues. For instance, the additional step of a post-bake requires added labour, time and expense to the process. Furthermore, a post-bake results in a considerable loss in initial performance while the cross-links are being formed thermally. This loss is referred to as "the dip", with bond strength recovery occurring after approximately one week at a temperature of 150° C. (See FIG. 1.)

Despite these efforts, there has been a long standing desire to achieve more robust thermal and humidity performance from cyanoacrylate compositions. Accordingly, it would be quite advantageous to provide another solution to satisfy that desire.

SUMMARY

In one aspect, the present invention provides a cyanoacrylate composition comprising:
(a) a cyanoacrylate component;
(b) a toughening agent comprising a copolymer of polyethylene and polyvinyl acetate;
(c) a component having at least two (meth)acrylate functional groups having the formula:

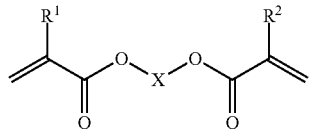

wherein $R^1$ and $R^2$ are the same or different and are selected from the group consisting of H or Me; and wherein X is a $C_4$ to $C_{30}$ alkyl chain and wherein said chain is optionally substituted with one or more acrylate and/or methacrylate functional groups, and/or one or more $C_1$-$C_{10}$ alkyl groups;
(d) a benzonitrile component; and
(e) an anhydride component.

The toughening agent may comprise an ethylene-vinyl acetate copolymer comprising 30 wt % vinyl acetate to 95 wt % vinyl acetate based on the total weight of the copolymer.

The toughening agent may be present in an amount of from about 2 wt % to about 25 wt % based on the total weight of the cyanoacrylate composition, such as in an amount of from about 3 wt % to about 12 wt % based on the total weight of the cyanoacrylate composition.

The component having at least two (meth)acrylate functional groups may be present in an amount of from about 1.5 wt % to about 20 wt % based on the total weight of the cyanoacrylate composition, such as in an amount of from about 3 wt % to about 12 wt %, or from about 4 wt % to 8 wt % based on the total weight of the cyanoacrylate composition.

The benzonitrile component may be present in an amount of from about 0.01 wt % to about 10 wt % based on the total weight of the cyanoacrylate composition, such as in an amount of from about 0.1 wt % to about 3 wt %, or from about 0.2 wt % to about 1.2 wt %, based on the total weight of the cyanoacrylate composition.

The anhydride component may be present in an amount of from about 0.05 wt % to about 5 wt % based on the total weight of the cyanoacrylate composition, such as in an amount of from about 0.1 wt % to about 3 wt % of from about 0.2 wt % to about 1.2 wt % based on the total weight of the cyanoacrylate composition.

The cyanoacrylate component may comprise ethyl-2-cyanoacrylate and/or allyl-2-cyanoacrylate.

The component having at least two (meth)acrylate functional groups may be selected from:

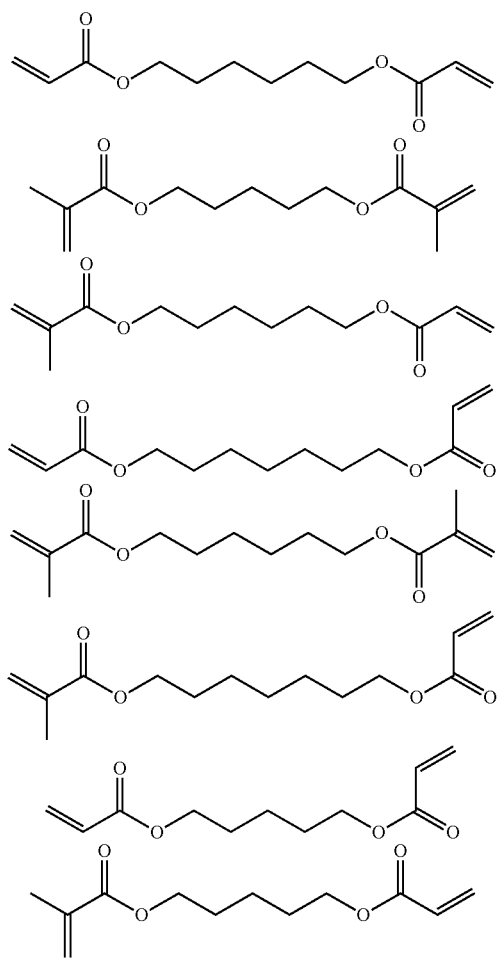

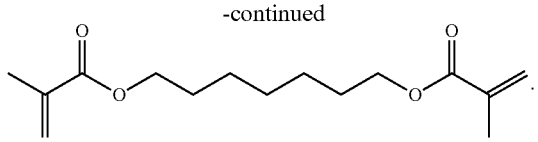

For example, the component having at least two (meth) acrylate functional groups may be hexanediol diacrylate.

The benzonitrile component may be selected from 3,5-dinitrobenzonitrile, 2-chloro-3,5-dinitrobenzonitrile, pentafluorobenzonitrile, 2-fluoro-4-(trifluoromethyl)benzonitrile, tetrachloroterephthalonitrile, tetrafluorophthalonitrile and tetrafluoroisophthalonitrile, preferably the benzonitrile component is tetrafluorophthalonitrile, or tetrafluoroisophthalonitrile.

The anhydride component may be an aromatic anhydride, such as phthalic anhydride.

Alternatively, the anhydride may be a hydrogenated anhydride, such a tetrahydrophthalic anhydride.

The cured cyanoacrylate composition according to any preceding claim.

In another aspect the present invention provides a method of bonding together two substrates, comprising the steps of applying a cyanoacrylate composition according to the invention, to at least one of the substrates, and mating together the substances for a time sufficient to permit an adhesive bond to form from the cyanoacrylate composition between the mated substrates.

In yet a further aspect, the present invention provides a bonded assembly comprising:

a first substrate having a first surface;

a second substrate having a second surface; and a cured cyanoacrylate composition disposed between said first and second surfaces, said composition, prior to cure, comprising a cyanoacrylate composition according to the present invention.

BRIEF DESCRIPTION OF THE DRAWINGS

FIG. 1 shows an X-Y plot of thermal performance of allyl-2-cyanoacrylate on grit blasted mild steel, after aging at a temperature of 150° C. On the plot, X is time (days) and Y is bond strength [N/mm$^2$].

DETAILED DESCRIPTION

The cyanoacrylate component includes at least one cyanoacrylate monomer which may be chosen with a raft of substituents, such as those represented by $H_2C=C(CN)-COOR$, where R is selected from $C_{1-15}$ alkyl, $C_{2-15}$ alkoxyalkyl, $C_{3-15}$ cycloalkyl, $C_{2-15}$ alkenyl, $C_{6-15}$ aralkyl, $C_{5-15}$ aryl, $C_{2-15}$ allyl and haloalkyl groups. Desirably, the cyanoacrylate monomer is selected from at least one of methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable cyanoacrylate monomer includes ethyl-2-cyanoacrylate. Suitably, the cyanoacrylate monomer may be ethyl-2-cyanoacrylate or allyl-2-cyanoacrylate. Optionally the cyanoacrylate component comprises ethyl-2-cyanoacrylate and allyl-2-cyanoacrylate.

The cyanoacrylate component should be included in the compositions in an amount within the range of from about 50% to about 99.98% by weight, with the range of about 70% to about 90% by weight, of the total composition being desirable.

Optionally, the cyanoacrylate composition may comprise a multi-functional cyanoacrylate component. Multi-functional cyanoacrylate components impart favourable heat resistance properties to cured cyanoacrylate compositions of the invention.

Multi-functional cyanoacrylate components are ordinarily bis-cyanoacrylates, but may be tri-functional, tetra-functional or penta-functional as well.

Bis-cyanoacrylates are embraced by following structure:

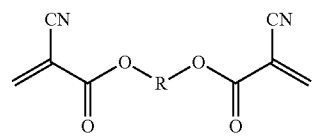

where R is a linkage selected from $(CH_2)n$, with n being 2, 3, 4, 5, 6, 7, 8, 9, 10, 11, or 12, such as a linear or branched chain alkylene. Bis-cyanoacrylates of this sort may be prepared through a transesterification reaction using an appropriate diol to yield the alkylene centre segment for "R". Desirable examples of these bis-cyanoacrylates include 1,10-decanediol bis-cyanoacrylate, 1,8-octanediol bis-cyanoacrylate, and 1,6-hexane bis-cyanoacrylate. An appropriate synthetic method to yield such bis-cyanoacrylates may be found generally in U.S. Pat. No. 3,975,422 (Buck), U.S. Pat. No. 4,012,402 (Buck), and U.S. Pat. No. 6,096,848 (Gololobov), and International Patent Publication No. WO 2010/091975.

The multi-functional cyanoacrylate component may be included in the compositions in an amount within the range of from about 5% to about 30% by weight, with the range of about 10% to about 20% by weight, of the total composition being desirable.

The toughening agent comprises a copolymer of polyethylene and polyvinyl acetate. Agents which are particularly suitable for use in accordance with the present invention are those agents comprising copolymers of polyethylene and polyvinyl acetate which are sold under the trade name LEVAMELT by Lanxess Limited.

A range of LEVAMELT agents is available and includes for example, LEVAMELT 400, LEVAMELT 600 and LEVAMELT 900. These agents differ in the amount of vinyl acetate present. For example, LEVAMELT 400 represents an ethylene-vinyl acetate copolymer comprising 40 wt % vinyl acetate based on the total weight of the copolymer. The LEVAMELT products are supplied in granular form. The granules are almost colourless and dusted with silica and talc. The product may also be supplied in bales of 25 kg under the trade name LEVAPREN.

The use of a toughening agent comprising a copolymer of polyethylene and polyvinyl acetate allows different cyanoacrylate esters to be formed as tough adhesives.

The toughening agent may comprise an ethylene-vinyl acetate copolymer comprising 30 wt % vinyl acetate to 95 wt % vinyl acetate based on the total weight of the copolymer. For example the copolymer may comprise about 50 wt % to about 95 wt % vinyl acetate, or about 70 wt % to about 95 wt % vinyl acetate, based on the total weight of the copolymer. The toughening agent may comprise an ethylene-vinyl acetate copolymer comprising about 70 wt % vinyl acetate, or about 80 wt % vinyl acetate or about 90 wt % vinyl acetate based on the total weight of the copolymer.

A particularly preferred toughening agent for use in accordance with the present invention comprises a polymer of polyethylene and polyvinyl acetate wherein the vinyl acetate is present in an amount of 90 wt % based on the total weight of the copolymer.

A structural representation of the toughening agent is depicted below:

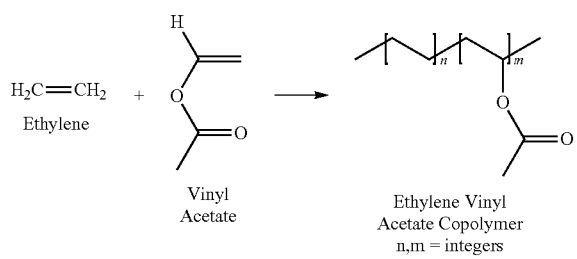

Vinyl Acetate    Ethylene Vinyl Acetate Copolymer
n,m = integers

The LEVAMELT elastomers are high performance elastomers. Various grades of LEVAMELT elastomers are available from Lanxess Limited. They dissolve more readily than other tougheners currently used in the art, for example, VAMAC. They are readily available in both monomers and perform better than VAMAC in ethyl cyanoacrylate. LEVAMELT consists of methylene units forming a saturated main chain with pendant acetate groups. The presence of a fully saturated main chain is an indication that LEVAMELT is a particularly stable polymer. It does not contain any reactive double bonds which make conventional rubbers prone to aging reactions, ozone and UV light. The saturated backbone makes it robust.

Further, the LEVAMELT elastomers are available without any of the processing aids that are used for most of the VAMAC elastomers. As a result, these elastomers facilitate the use of other monomers such as methyl cyanoacrylate, ethyl-2-cyanoacrylate, propyl cyanoacrylates, butyl cyanoacrylates, octyl cyanoacrylates, allyl cyanoacrylates, β-methoxyethyl cyanoacrylate, propargyl cyanoacrylate and mixtures thereof. This allows different cyanoacrylate esters to be formulated as tough adhesives.

The LEVAMELT elastomers are available in pellet form and are easier to formulate than other known elastomeric toughening agents. Furthermore, these elastomers are less expensive than other known elastomers. Thus, these elastomers allow for the formulation of a more cost-effective toughened cyanoacrylate composition which provides better performance compared to known toughened cyanoacrylate compositions.

The toughening agent may be present in an amount of from about 2 wt % to about 25 wt % based on the total weight of the cyanoacrylate composition. Suitably, the toughening agent may be present in an amount of from about 2 wt % or more to an amount of from about 25 wt % or less based on the total weight of the cyanoacrylate composition. The toughening agent may be present in an amount of about 2 wt % or more, such as about 4 wt % or about 6 wt % or about 8 wt % or about 10 wt % based on the total weight of the cyanoacrylate. Suitably, the toughening agent may be present in amount of about 25 wt % or less, such as about 20 wt % or about 18 wt % or about 16 wt % or about 14 wt % based on the total weight of the cyanoacrylate composition.

For example, the toughening agent may be present in an amount of from about 2 wt % to about 18 wt % based on the total weight of the cyanoacrylate composition, such as in an amount of from about 4 wt % to about 16 wt %, or in an amount of from about 6 wt % to about 14 wt % based on the total weight of the cyanoacrylate composition.

The component having at least two (meth)acrylate components has the formula $$\underset{O}{\overset{R^1}{\diagup\!\!\!\diagdown}}\!\!\!\diagdown_O\diagdown_X\diagdown_O\underset{O}{\overset{R^2}{\diagdown\!\!\!\diagup}}$$

wherein $R^1$ and $R^2$ are the same or different and are selected from the group consisting of H or Me; and wherein X is a $C_4$ to $C_{30}$ alkyl chain and wherein said chain is optionally substituted with one or more acrylate and/or methacrylate functional groups, and/or one or more $C_1$-$C_{10}$ alkyl groups.

Optionally $R^1$ and $R^2$ are methyl.

X may be a $C_4$ alkyl chain, or a $C_5$ alkyl chain, or a $C_6$ alkyl chain, or a $C_7$ alkyl chain, or a $C_8$ alkyl chain, or a $C_9$ alkyl chain, or a $C_{10}$ alkyl chain, or a $C_{11}$ alkyl chain, or a $C_{12}$ alkyl chain.

Suitably, the alkyl chain has one or more pendant (meth)acrylate functional groups.

The component having at least two (meth)acrylate components may for example be hexanediol diacrylate or hexanediol dimethacrylate.

The component having at least two (meth)acrylate functional groups may be present in an amount of from about 1.5 wt % or more to an amount of from about 20 wt % or less based on the total weight of the cyanoacrylate composition. The component having at least two (meth)acrylate functional groups may be present in an amount of about 1.5 wt % or more, such as about 3 wt %, or about 4 wt %, or about 5 wt %, or about 6 wt %, or about 8 wt %, based on the total weight of the cyanoacrylate composition. The component having at least two (meth)acrylate functional groups may be present in an amount of about 20 wt % or less, such as 18 wt %, or 16 wt %, or 14 wt %, or 12 wt %, or 10 wt %, based on the total weight of the cyanoacrylate composition.

Suitably, the component having at least two (meth)acrylate functional groups may be present in an amount of from about 2 wt % to about 14 wt %, such as from about 3 wt % to about 12 wt %, or from about 4 wt % to about 11 wt %, or from about 5 wt % to about 10 wt % based on the total weight of the cyanoacrylate composition.

The benzonitrile component may be present in an amount of from about 0.01 wt % to about 10 wt % based on the total weight of the cyanoacrylate composition. For example, the benzonitrile component may be present in an amount of from about 0.01 wt % or more, such as in an amount of 0.05 wt %, or about 0.1 wt %, or about 0.2 wt % or about 0.3 wt % or about 0.4 wt %, or about 0.5 wt %, or about 1 wt %, or about 2 wt % based on the total weight of the cyanoacrylate composition. The benzonitrile component may be present in an amount of from 10 wt % or less, such as in an amount of from about 8 wt % or 6 wt % or 4 wt % or 2 wt % or 1 wt % based on the total weight of the cyanoacrylate composition.

Suitably, the benzonitrile component may be present in an amount of from about 0.1 wt % to about 3 wt %, or from about 0.2 wt % to about 1.2 wt %, based on the total weight of the cyanoacrylate composition.

The benzonitrile component is suitably tetrafluorophthalonitrile or tetrafluoroisophthalonitrile. Formulations comprising tetrafluoroisophthalonitrile demonstrated superior tensile strength performance after thermal ageing, particularly after thermal aging at 120° C. for 6 weeks.

The anhydride component may be present in an amount of from about 0.05 wt % to about 5 wt % based on the total weight of the cyanoacrylate composition. For example the anhydride component may be present in an amount of from about 0.05 wt % or more, such as about 0.1 wt %, or about 0.2 wt %, or about 0.3 wt % or about 0.4 wt % or about 0.5 wt %, or about 1 wt %, based on the total weight of the cyanoacrylate composition. The anhydride component may be present in an amount of from about 5 wt % or less, such as about 4 wt %, or about 3 wt %, or about 2 wt %, or about 1 wt %, based on the total weight of the composition.

Suitably, the anhydride component may be present in an amount of from about 0.1 wt % to about 3 wt %, or of from about 0.2 wt % to about 1.2 wt %, or about 0.3 wt % to about 1 wt % based on the total weight of the cyanoacrylate composition.

Thermal resistance conferring agents may also be added. Included among such agents are certain sulfur-containing compounds, such as sulfonates, sulfinates, sulfates and sulfites as set forth in U.S. Pat. No. 5,328,944 (Attarwala), the disclosure of which is hereby expressly incorporated herein by reference.

For example, compositions of the invention may optionally comprise additives which confer thermal resistance properties such as 2-sulfobenzoic acid anhydride, triethylene glycol di(p-toluene sulfonate), trifluoroethyl p-toluene sulfonate, dimethyl dioxolan-4-ylmethyl p-toluene sulfonate, p-toluene sulfonic anhydride, methanesulfonic anhydride, 1,3 propylene sulfite, dioxathiolane dioxide, 1,8-naphthosultone, sultone 1,3-propane, sultone 1,4-butene, allyl phenyl sulfone, 4-fluorophenyl sulfone, dibenzothiophene sulfone, bis(4-fluorophenyl) sulfone, ethyl p-toluenesulfonate, trifluoromethanesulfonic anhydride.

Accelerators may be included in the inventive cyanoacrylate compositions, such as any one or more selected from calixarenes and oxacalixarenes, silacrowns, crown ethers, cyclodextrins, polyethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

For instance, as regards calixarenes, those within the following structure are useful herein:

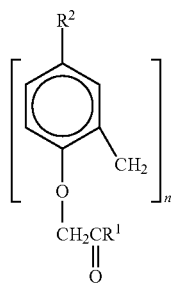

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, examples which may be used herein either individually or in combination, or in combination with other first accelerator include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4,1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methyl-benzo-18-crown-6,1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Of the silacrowns, again many are known, and are reported in the literature. For instance, a typical silacrown may be represented within the following structure:

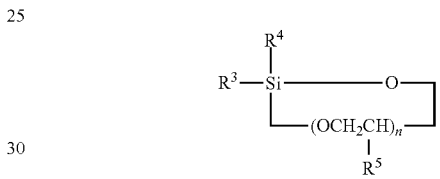

where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups, such as methoxy, and aryloxy groups, such as phenoxy. The $R^3$ and $R^4$ groups may contain halogen or other substituents, an example being trifluoropropyl. However, groups not suitable as $R^4$ and $R^5$ groups are basic groups, such as amino, substituted amino and alkylamino.

Specific examples of silacrown compounds useful in the inventive compositions include:

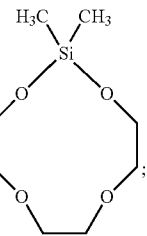

dimethylsila-11-crown-4

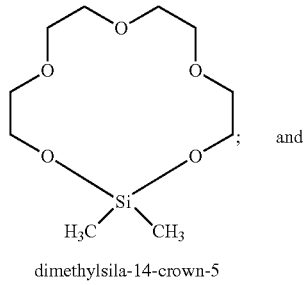

; and dimethylsila-14-crown-5

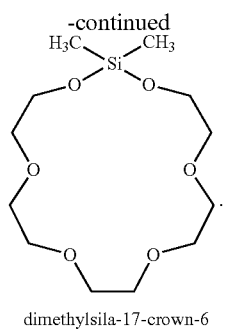

dimethylsila-17-crown-6

See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices.

For instance, polyethylene glycol) di(meth)acrylates suitable for use herein include those within the following structure:

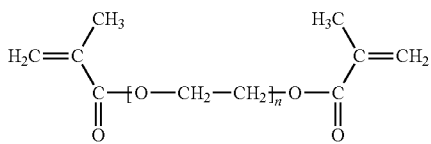

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure:

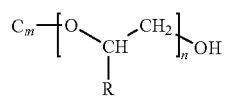

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

Commercially available examples of materials within the above structure include those offered under the DEHYDOL tradename from BASF SE, Lugwigshafen, Germany.

When used, the accelerator embraced by the above structures should be included in the compositions in an amount within the range of from about 0.01% to about 10% by weight, with the range of about 0.1 to about 0.5% by weight being desirable, and about 0.4% by weight of the total composition being particularly desirable.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g. U.S. Pat. Nos. 5,530,037 and 6,607,632, the disclosures of each of which are hereby incorporated herein by reference.

Commonly used free-radical stabilizers include hydroquinone, while commonly used anionic stabilizers include boron triflouride, boron trifluoride-etherate, sulfur trioxide (and hydrolyis products thereof), sulfur dioxide and methane sulfonic acid.

Other additives may be included to confer additional physical properties, such as improved shock resistance (for instance, citric acid), thickness (for instance, polymethyl methacrylate), thixotropy (for instance fumed silica), and colour.

These other additives may be used in the inventive compositions individually in an amount from about 0.05% to about 20%, such as about 1% to 15%, desirably 5% to 10% by weight, depending of course on the identity of the additive. For instance, and more specifically, citric acid may be used in the inventive compositions in an amount of 5 to 500 ppm, desirably 10 to 100 ppm.

Examples

TABLE 1

| Component | Formulation (wt %) | | | | |
| --- | --- | --- | --- | --- | --- |
| | A | B | C | D | E |
| Ethyl 2-cyanoacrylate | 93 | 80 | 79 | 79 | 79 |
| Stabiliser Solution | 0.5 | 1.9 | 1.9 | 1.9 | 1.9 |
| Vamac VSC 5500 | | 10 | 10 | — | — |
| Levamelt 900 | | — | — | 10 | — |
| Polymethyl methacrylate (PMMA) | 6.5 | — | — | — | 10 |
| Hexanediol Diacrylate (HDDA) | | 8 | 8 | 8 | 8 |
| Tetrahydrophthalic Anhydride (THPA) | | 0.1 | 0.1 | 0.1 | 0.1 |
| Tetrafluoroisophthalonitrile (TFIPN) | | — | 1 | 1 | 1 |
| Initials (MPa) | | | | | |
| GBMS 1 Week | | 20.6 | 21.6 | 20.2 | 15.4 | 19.9 |
| 100° C. (MPa) | | | | | |
| GBMS 3 Weeks | | 10.5 | 23.1 | 25.2 | 24.5 | 14.1 |
| GBMS 6 Weeks | | 8.8 | 24.2 | 27.8 | 26.6 | 14.7 |
| 120° C. (MPa) | | | | | |
| GBMS 3 Weeks | | 7.3 | 7.6 | 24.7 | 24.4 | 16 |
| GBMS 6 Weeks | | 4.2 | 4.4 | 20.7 | 25.3 | 13.4 |
| 40° C./98% RH (MPa) | | | | | |
| GBMS 3 Weeks | | 12.3 | 17.2 | 17 | 12.6 | 14.2 |
| GBMS 6 Weeks | | 12.1 | 18.3 | 18.5 | 9.5 | 15 |

Formulation A is a standard flexible cyanoacrylate formulation which comprises:
Ethyl-2-cyanoacrylate, polymethylmethacrylate and a stabilizer. The stabilizer used in formulation 1 above is a combination of methane sulfonic acid and sulfur dioxide.

The tensile strength for each of the compositions of Table 1 was determined according to ASTM D1002 for the determination of shear strength of adhesives using lap shear specimens. Each of formulations A to E is applied to grit blasted mild steel lap shears, and bonded assemblies prepared for thermal performance evaluation.

Initial tensile strength performance is determined after cure for 1 week at room temperature.

Table 1 shows the performance of prior art cyanoacrylate compositions and cyanoacrylate compositions according to the invention. Formulation A is a typical cyanoacrylate composition, with PMMA used as thickener. Thermal ageing at both 100° C. and 120° C. leads to a significant decrease in tensile strength performance. Similarly, tensile strength performance of formulation A after thermal ageing at 40° C. in 98% relative humidity after both 3 and 6 weeks was significantly lower than the initial tensile strength performance. Thermal aging for 6 weeks at 100° C. resulted in a typical percentage fall for a cyanoacrylate-type product to about 40% of its initial value, with about 20% of the initial value maintained after heat ageing at 120° C. for 6 weeks. Thermal aging at 40° C. in 98% relative humidity resulted in about 60% of its initial value being maintained.

Formulation B shows the benefit the improved heat aging at 100° C. with the addition of hexanediol diacrylate in combination with Vamac rubber and tetrahydrophthalic anhydride. However, no improvement is observed after thermal ageing at 120° C. The addition of TFIPN in formulation C shows significant improvement at 100° C. and in particular at 120° C.

While initial tensile strength performance for formulation D is reduced in comparison to formulations A to C, the tensile strength performance of formulation D which comprises Levamelt in place of the Vamac rubber shows exceptional tensile strength performance after heat aging at both 100° C. and 120° C. Formulation E which comprises PMMA used in place of both the Vamac and Levamelt toughening agents had a comparable initial tensile strength performance to formulations A to C, and although an improvement in tensile strength performance after thermal ageing was observed over formulation A, the formulations comprising Vamac or Levamelt performed significantly better in thermal ageing experiments.

TABLE 2

| Components | Formulation (wt %) | | | | | |
| --- | --- | --- | --- | --- | --- | --- |
| | F | G | H | I | J | K |
| Ethyl 2-cyanoacrylate | 87.1 | 85.1 | 83.1 | 85.1 | 39.6 | — |
| Allyl 2-cyanoacrylate | — | — | — | — | 41.5 | 81.1 |
| Stabiliser Solution | 1.9 | 1.9 | 1.9 | 1.9 | 1.9 | 1.9 |
| Levamelt 900 | 4.0 | 6.0 | 8.0 | 8.0 | 10.0 | 10.0 |
| Hexanediol Diacrylate | 6.0 | 6.0 | 6.0 | 4.0 | 6.0 | 6.0 |
| Phthalic Anhydride | 0.5 | 0.5 | 0.5 | 0.5 | 0.5 | 0.5 |
| Tetrafluoroisophthalonitrile | 0.5 | 0.5 | 0.5 | 0.5 | 0.5 | 0.5 |
| Initials (MPa) | | | | | | |
| GBMS 1 Week Cure | 18.8 | 19.2 | 20.2 | 20.2 | 17.7 | 18.2 |
| 100° C. | | | | | | |
| 3 Weeks | 18.5 | 20.1 | 21.5 | 18.6 | 18.3 | 18.3 |
| 6 Weeks | 16.9 | 19.1 | 21.0 | 17.9 | 18.3 | 15.9 |
| 120° C. | | | | | | |
| 3 Weeks | 21.1 | 23.7 | 25.1 | 22.1 | 18.3 | 10.1 |
| 6 Weeks | 22.4 | 26.0 | 23.1 | 21.1 | 8.1 | 9.8 |
| 150° C. | | | | | | |
| 3 Weeks | 1.0 | 0.0 | 0.0 | 0.0 | 10.8 | 8.8 |
| 6 Weeks | 0.0 | 0.0 | 0.0 | 0.0 | 15.3 | 10.4 |

TABLE 2-continued

| Components | Formulation (wt %) | | | | | |
| --- | --- | --- | --- | --- | --- | --- |
| | F | G | H | I | J | K |
| 40° C./98% RH | | | | | | |
| 3 Weeks | 20.5 | 22.6 | 22.9 | 21.5 | 18.4 | 13.9 |
| 6 Weeks | 22.1 | 19.3 | 18.5 | 19.0 | 16.3 | 12.5 |

Formulations F to H investigate the effect of various levels of Levamelt on heat aging. Higher levels of Levamelt generally shows improvement performance in particular at 100° C. Formulation I looks at lower loadings of HDDA and demonstrates that 6% shows improved aging over the corresponding 4% formulation.

Formulations J and K demonstrate the effect of ally-2-cyanoacrylate on the heat aging. A clear benefit is shown at 150° C. where ethyl based formulations show no durability.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A cyanoacrylate composition comprising:
   (a) a cyanoacrylate component;
   (b) a toughening agent comprising a copolymer of ethylene and vinyl acetate, wherein the vinyl acetate content in the copolymer is in an amount of about 50 wt % to about 95 wt %, based on the total weight of the copolymer, and wherein the toughening agent is present in the composition in an amount of about 2 wt % to about 25 wt %, based on the total weight of the cyanoacrylate composition;
   (c) a component having at least two (meth)acrylate functional groups having the formula:

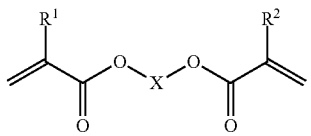

wherein $R^1$ and $R^2$ are the same or different and are selected from the group consisting of H or Me; and wherein X is a $C_4$ to $C_{30}$ alkyl chain and wherein said chain is optionally substituted with one or more acrylate and/or methacrylate functional groups, and/or one or more $C_1$-$C_{10}$ alkyl groups;
   (d) a benzonitrile component; and
   (e) an anhydride component.

2. The cyanoacrylate composition according to claim 1, wherein the toughening agent comprises an ethylene-vinyl acetate copolymer comprising 70 wt % vinyl acetate to 95 wt % vinyl acetate based on the total weight of the copolymer.

3. The cyanoacrylate composition according to claim 1, wherein the toughening agent is present in an amount of from about 4 wt % to about 25 wt % based on the total weight of the cyanoacrylate composition.

4. The cyanoacrylate composition according to claim 1, wherein the component having at least two (meth)acrylate functional groups is present in an amount of from about 1.5 wt % to about 20 wt % based on the total weight of the cyanoacrylate composition.

5. The cyanoacrylate composition according to claim 1, wherein the benzonitrile component is present in an amount of from about 0.01 wt % to about 10 wt % based on the total weight of the cyanoacrylate composition.

6. The cyanoacrylate composition according to claim 1, wherein the anhydride component is present in an amount of from about 0.05 wt % to about 5 wt % based on the total weight of the cyanoacrylate composition.

7. The cyanoacrylate composition according to claim 1, wherein the cyanoacrylate component comprises ethyl-2-cyanoacrylate or allyl-2-cyanoacrylate.

8. The cyanoacrylate composition according to claim 1, wherein the cyanoacrylate component comprises a combination of ethyl-2-cyanoacrylate and allyl-2-cyanoacrylate.

9. The cyanoacrylate composition according to claim 1, wherein the component having at least two (meth)acrylate functional groups is selected from:

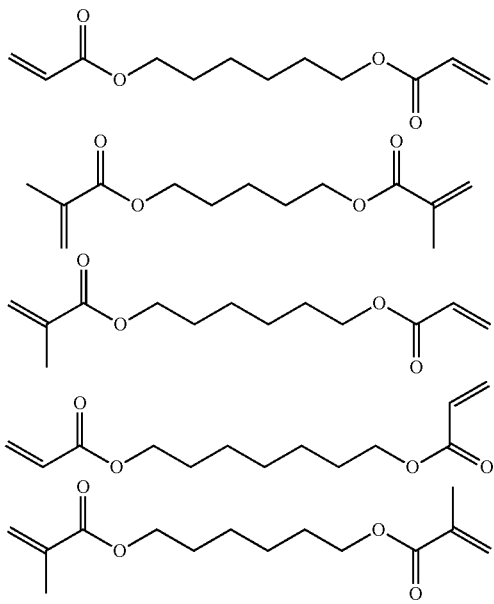

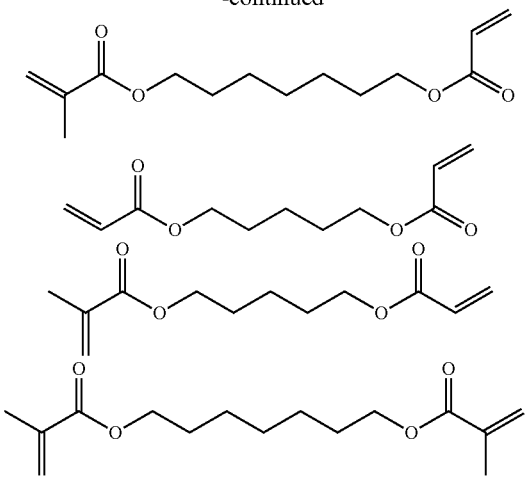

10. The cyanoacrylate composition according to claim 9 wherein the component having at least two (meth)acrylate functional groups is hexanediol diacrylate.

11. The cyanoacrylate composition according to claim 1, wherein the benzonitrile component is a member selected from the group consisting of 3,5-dinitrobenzonitrile, 2-chloro-3,5-dinitrobenzonitrile, pentafluorobenzonitrile, 2-fluoro-4-(trifluoromethyl)benzonitrile, tetrachloroterephthalonitrile, tetrafluorophthalonitrile and tetrafluoroisophthalonitrile.

12. The cyanoacrylate composition according to claim 1, wherein the anhydride component is an aromatic anhydride.

13. The cyanoacrylate composition according to claim 1, wherein the anhydride is a hydrogenated anhydride.

14. The cured cyanoacrylate composition according to claim 1.

15. A method of bonding together two substrates, comprising the steps of applying a cyanoacrylate composition according to claim 1, to at least one of the substrates, and mating together the substances for a time sufficient to permit an adhesive bond to form from the cyanoacrylate composition between the mated substrates.

16. A bonded assembly comprising:
a first substrate having a first surface;
a second substrate having a second surface; and
a cured cyanoacrylate composition disposed between said first and second surfaces, said composition, prior to cure, comprising a cyanoacrylate composition according to claim 15.

* * * * *

UNITED STATES PATENT AND TRADEMARK OFFICE
CERTIFICATE OF CORRECTION

| | | |
|---|---|---|
| PATENT NO. | : 11,555,135 B2 | |
| APPLICATION NO. | : 16/670074 | |
| DATED | : January 17, 2023 | |
| INVENTOR(S) | : Raymond P. Tully et al. | |

It is certified that error appears in the above-identified patent and that said Letters Patent is hereby corrected as shown below:

In the Specification

Column 11, Line 24 change "polyethylene glycol)" to --poly(ethylene glycol)--.

Signed and Sealed this
Fourteenth Day of November, 2023

Katherine Kelly Vidal
*Director of the United States Patent and Trademark Office*